(No Model.) 2 Sheets—Sheet 1.

W. T. ARMSTRONG & R. H. THOMAS.
GLASS FURNACE.

No. 328,173. Patented Oct. 13, 1885.

WITNESSES
R. H. Whittlesey
C. M. Clarke

INVENTORS.
William T. Armstrong,
Robert H. Thomas,
BY J. Snowden Bell
ATTORNEY.

(No Model.) 2 Sheets—Sheet 2.

W. T. ARMSTRONG & R. H. THOMAS.
GLASS FURNACE.

No. 328,173. Patented Oct. 13, 1885.

WITNESSES:
R. H. Whittlesey
O. M. Clarke

INVENTORS.
William T. Armstrong
Robert H. Thomas,
BY Snowden Bell
ATTORNEY.

UNITED STATES PATENT OFFICE.

WILLIAM T. ARMSTRONG AND ROBERT H. THOMAS, OF CHARTIERS, PA.

GLASS-FURNACE.

SPECIFICATION forming part of Letters Patent No. 328,173, dated October 13, 1885.

Application filed June 4, 1885. Serial No. 167,621. (No model.)

*To all whom it may concern:*

Be it known that we, WILLIAM T. ARMSTRONG and ROBERT H. THOMAS, both of Chartiers, in the county of Allegheny and State of Pennsylvania, have invented certain new and useful Improvements in Glass-Furnaces, of which improvements the following is a specification.

The object of our invention is to provide a glass-furnace adapted to the effective and economical combustion of gaseous fuel, and in which the manufacture of glass of several different descriptions may be simultaneously and independently conducted.

To this end our invention, generally stated, consists in the combination of a furnace divided by partition-walls into a series of independent tanks or compartments, a series of gas-supply pipes and air-heating pipes opening into the furnace adjacent to said compartments, and a series of discharge-flues governed by dampers and serving to regulate the application of heat to any desired compartment of the series. The improvements claimed are hereinafter fully set forth.

Figure 1:
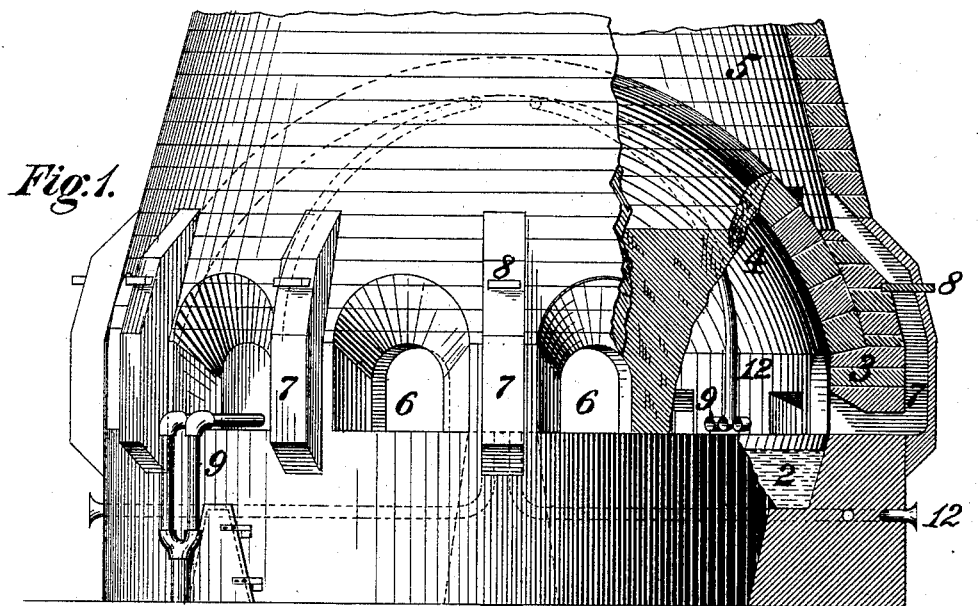
Figure 2:
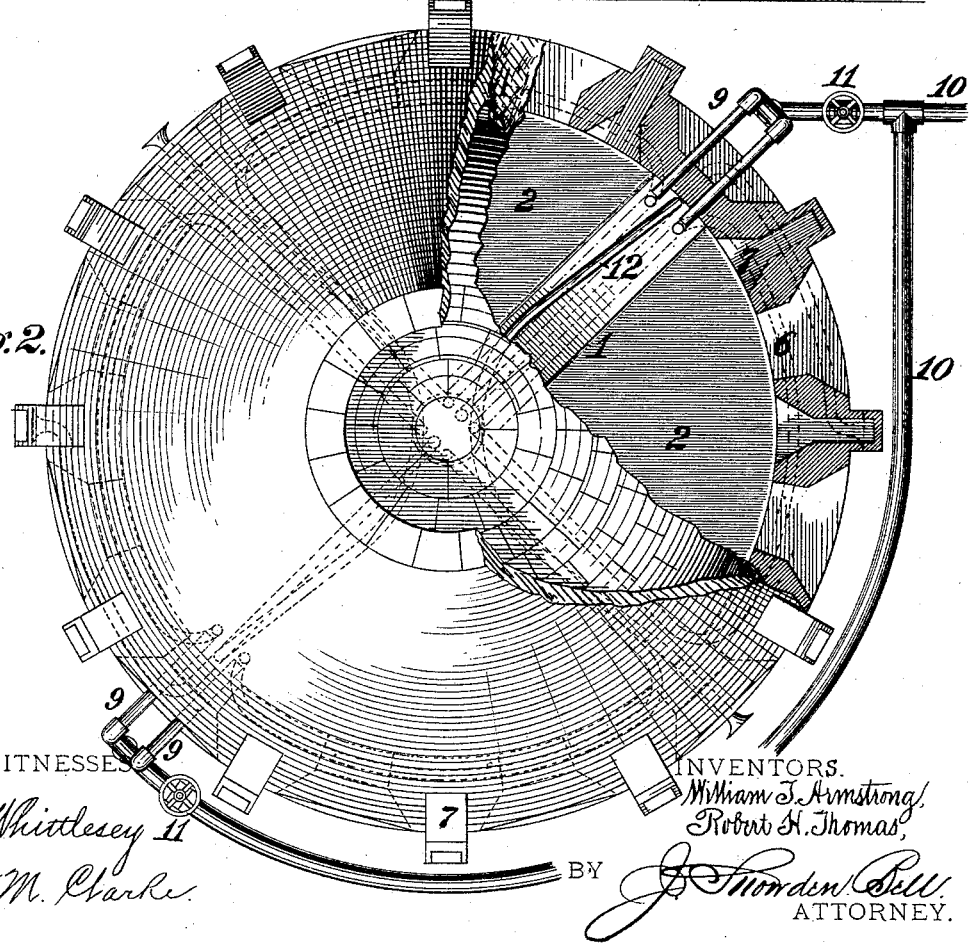
Figure 3:
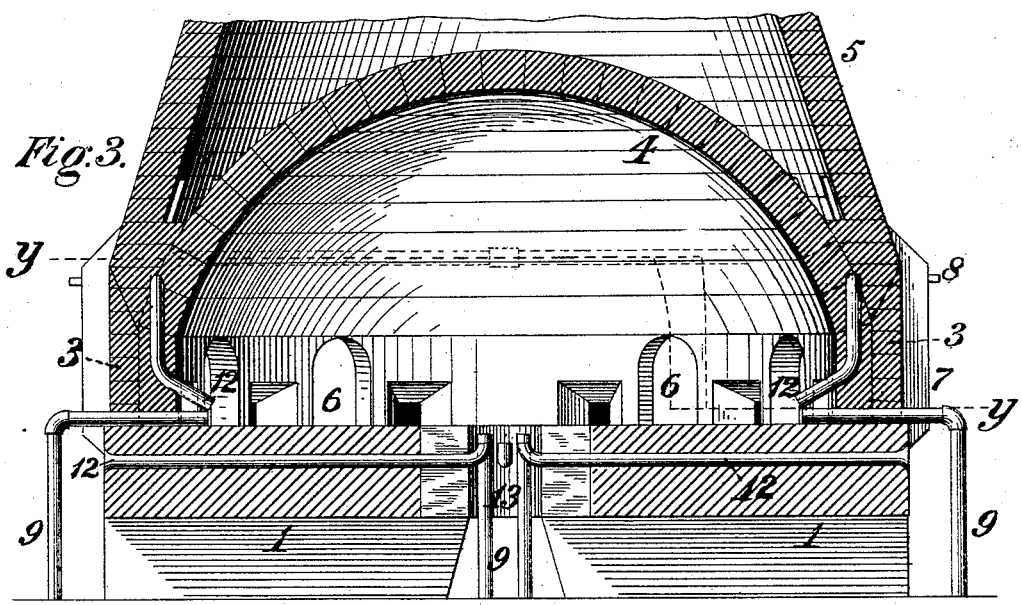
Figure 4:
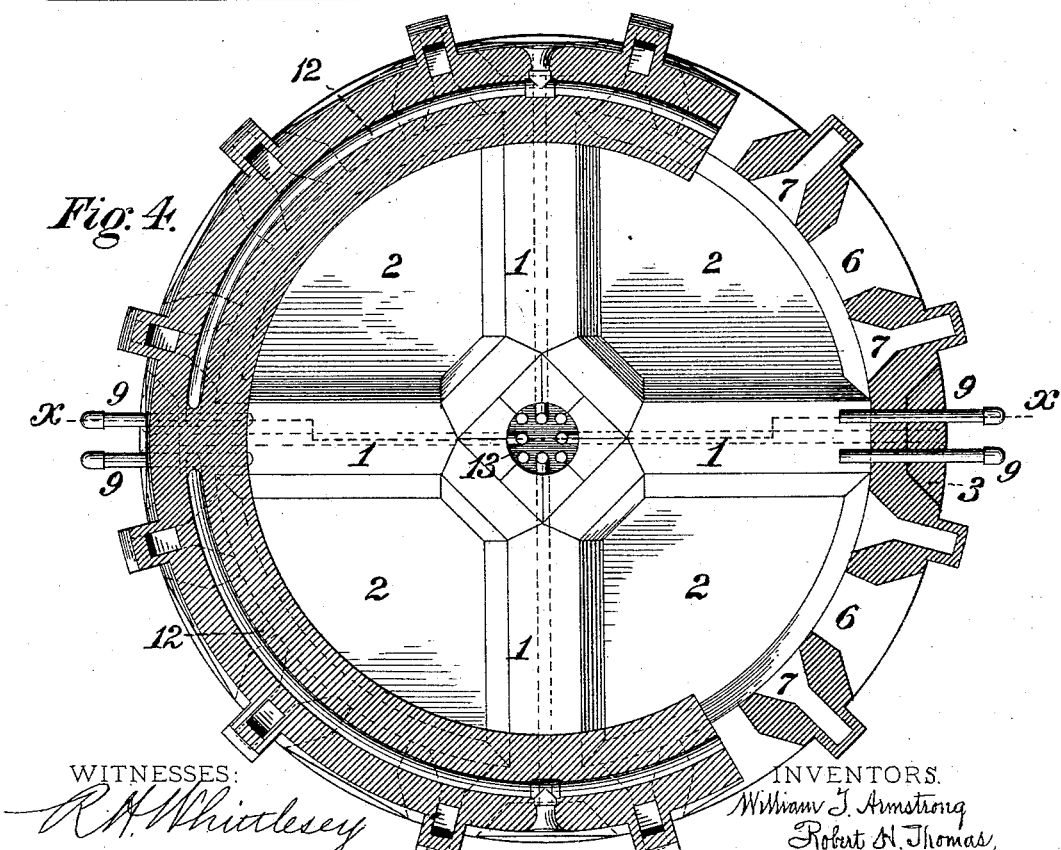

In the accompanying drawings, Figure 1 is a side view, partly in section, of a glass-furnace embodying our invention; Fig. 2, a plan or top view, partly in section, of the same; Fig. 3, a vertical section at the line $x\ x$ of Fig. 4, and Fig. 4 a horizontal section at the line $y\ y$ of Fig. 3.

In the practice of our invention we construct a furnace of blocks of suitably-burned pot-clay or other proper refractory material, in square, rectangular, or, as shown, circular form, and divide the same, by vertical partition-walls 1, into a series of independent tanks or compartments, 2, which are surrounded at top by a vertical breast-wall, 3, covered by an arched cap or crown, 4, the breast and crown forming a chamber, above which is located a stack for affording the necessary draft and carrying off the products of combustion. Vertical longitudinal openings are formed in the partition-walls 1, extending upwardly from their bases to a point below a series of air supply and heating pipes located in the upper portions of the walls, as shown in Fig. 1, said openings, each of which is interposed between two adjacent tanks, serving to prevent the glass in one tank working through the walls and mingling with that in the other. A series of ring-holes or working-openings, 6, through which access is had to the several tanks, is formed in the breast-wall 3, and one or more discharge-flues, 7, each provided with a valve or damper, 8, leads from the space above each tank into the stack 5. The glass in each tank being entirely separated from that in the remaining tanks, the manufacture of different kinds of glass can be simultaneously carried on in the furnace, and by suitable regulation of the dampers 8 a greater or less degree of heat may be imparted to either of the tanks, as required, by varying the strength of the draught through the discharge-flues thereof.

Our furnace being specially designed for the use of gas, and more particularly natural gas, as fuel, we provide for this purpose a series of gas-supply pipes, 9, communicating with a main, 10, and provided with proper regulating-valves 11, said pipes opening into the chamber above the tank 2, adjacent to the discharge-openings of air supply and heating pipes 12, to be presently described. The gas and air pipes may either discharge into the furnace at two or more points close to the breast-wall 3, or centrally, as preferred, and in the latter case they are carried up through a central eye or opening, 13, formed at the intersection of the tank-partitions 1; but in either case they discharge at or about the level of the tops of the tanks 2, so that the heat of the flame shall be diffused directly into the chamber above the tanks within the breast-wall 3 and below the cap 4.

The air-supply pipes pass through the walls of the furnace from the exterior thereof to their points of discharge, so as to enable the air to be heated as highly as practicable prior to its delivery and mixture with the gas, and may be led either upon or through the crown 4 or partition-walls 1, as preferred, the air in either case becoming thoroughly heated while being drawn through the pipes by the draft of the stack.

In operation a suitably-regulated supply of gas is admitted through the pipes 9 and ignited at their inner ends, where it meets the air entering through the pipes 12, which, when the walls of the furnace become heated, is discharged at a high temperature and maintains a strong and effective combustion, the heat of which is diffused throughout the chamber above the tanks and upon the melted glass therein. By proper manipulation of the dampers of the draft-flues a greater or less degree of heat may be imparted to any desired tank of the series in accordance with the requirements of the particular charge and description of glass which is being melted therein.

We are aware that the employment of air-heating pipes located in or upon the crown of a glass-furnace is not new, and such, therefore, we do not claim; neither do we broadly claim the combination of air and gas supply pipes with a glass-furnace, as we are aware that the same, as applied in connection with a mixing-chamber beneath the furnace, are not new.

We claim as our invention, and desire to secure by Letters Patent—

1. The combination, in a glass-furnace, of a series of partition-walls dividing the interior of the furnace into two or more tanks or compartments, said walls having longitudinal openings forming spaces, each interposed between two adjacent compartments, a breast-wall and crown surrounding and covering a chamber above said compartments, and a series of discharge-flues, each leading from said chamber above one of the compartments to a stack, substantially as set forth.

2. The combination, in a glass-furnace, of a series of independent lower tanks or compartments, a chamber formed by a breast-wall and crown above said compartments, a series of gas-supply pipes discharging into said chamber at or near the level of the top of the compartments, a series of air heating and supply pipes leading through or upon the walls of the furnace from its exterior to points adjacent to the discharges of the gas-supply pipes, and a series of discharge-flues leading from the chamber above the compartments to a stack, substantially as set forth.

3. The combination, in a glass-furnace, of a series of independent lower tanks or compartments, a chamber above said compartments provided with working-holes giving access to their contents, a series of air and gas pipes discharging into said chamber, and a series of discharge-flues governed by dampers, each of said flues leading from said chamber above one of the compartments to a stack, substantially as set forth.

W. T. ARMSTRONG.
     ROBERT H. THOMAS.

Witnesses:
 STEPHEN NEWBURN,
 RALPH D. READ.